Nov. 26, 1968   S. OLDBERG ET AL   3,412,625
TRANSMISSION SYSTEM
Filed May 19, 1966   5 Sheets-Sheet 1
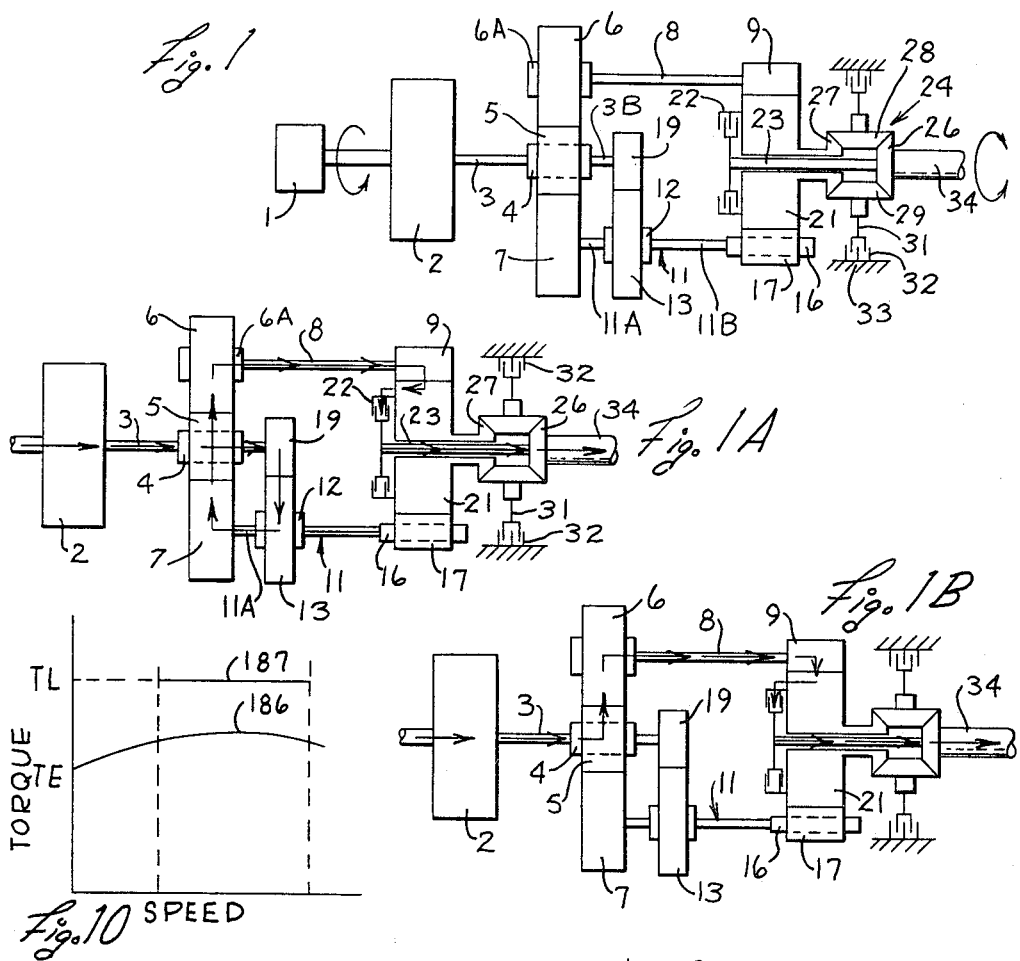
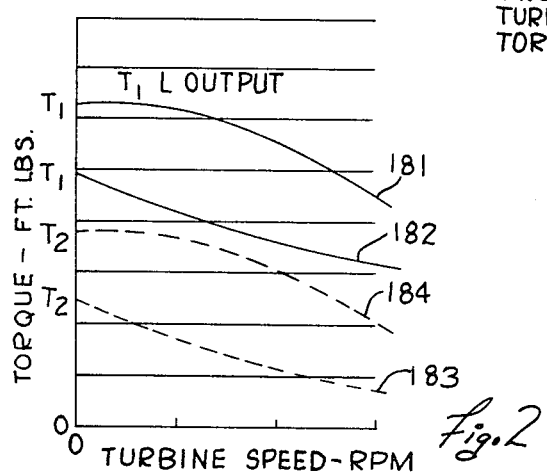
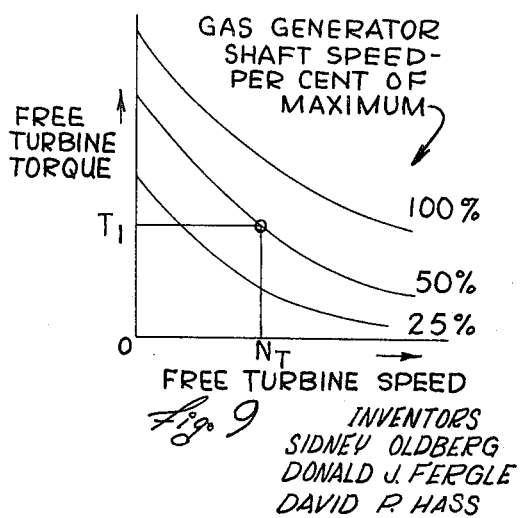
INVENTORS
SIDNEY OLDBERG
DONALD J. FERGLE
DAVID P. HASS
BY
Woodhams, Blanchard & Flynn
ATTORNEYS

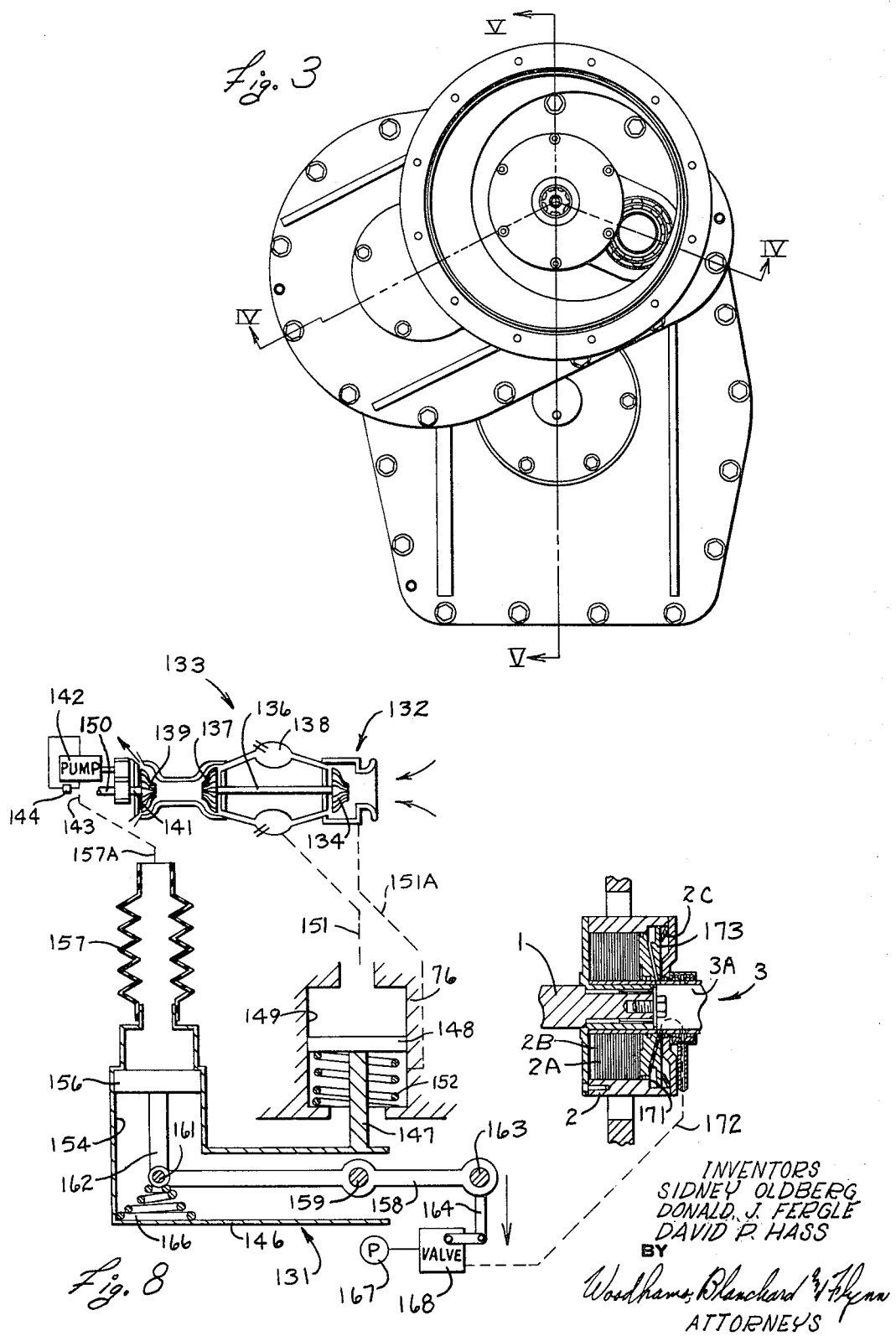

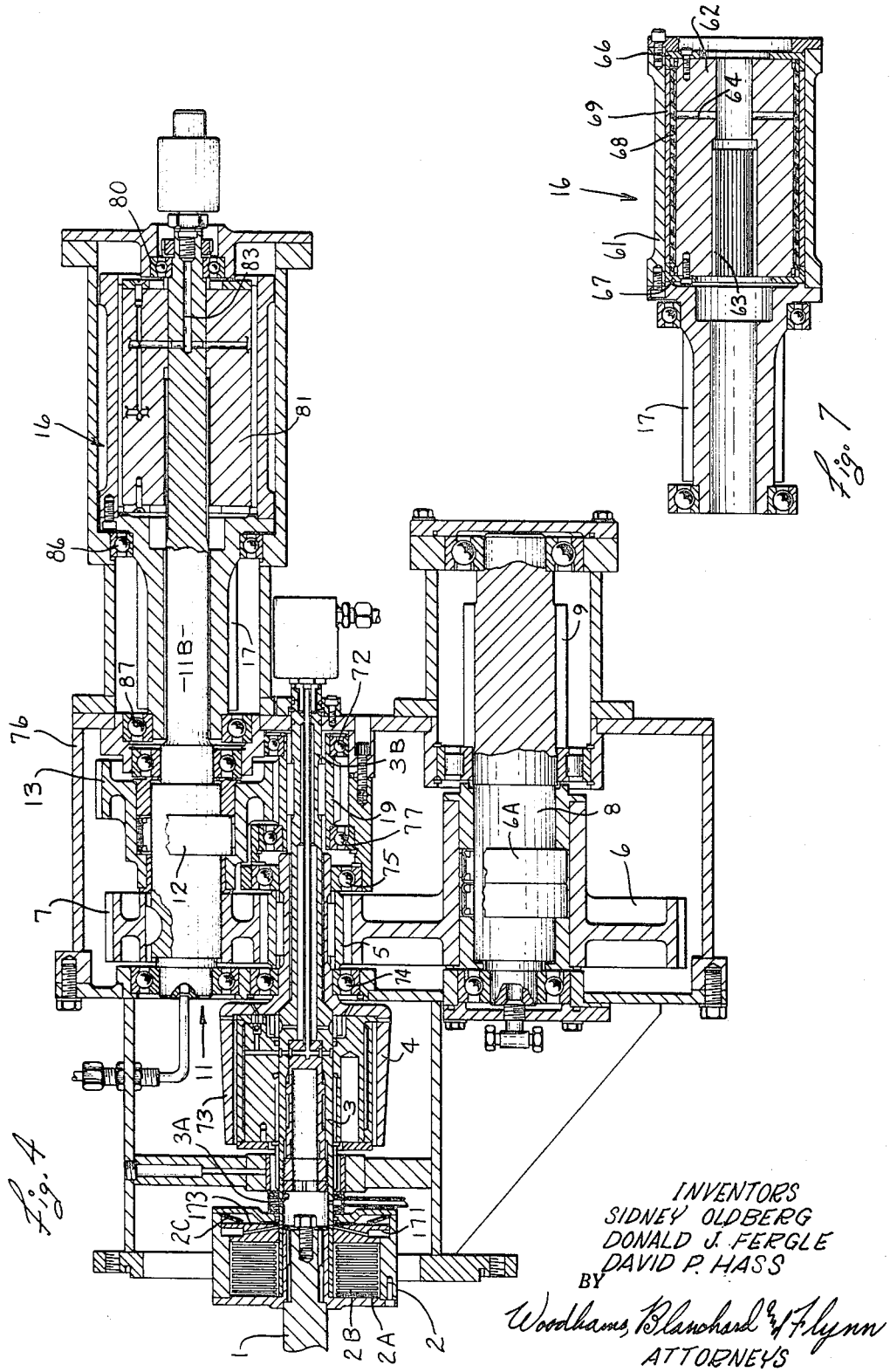

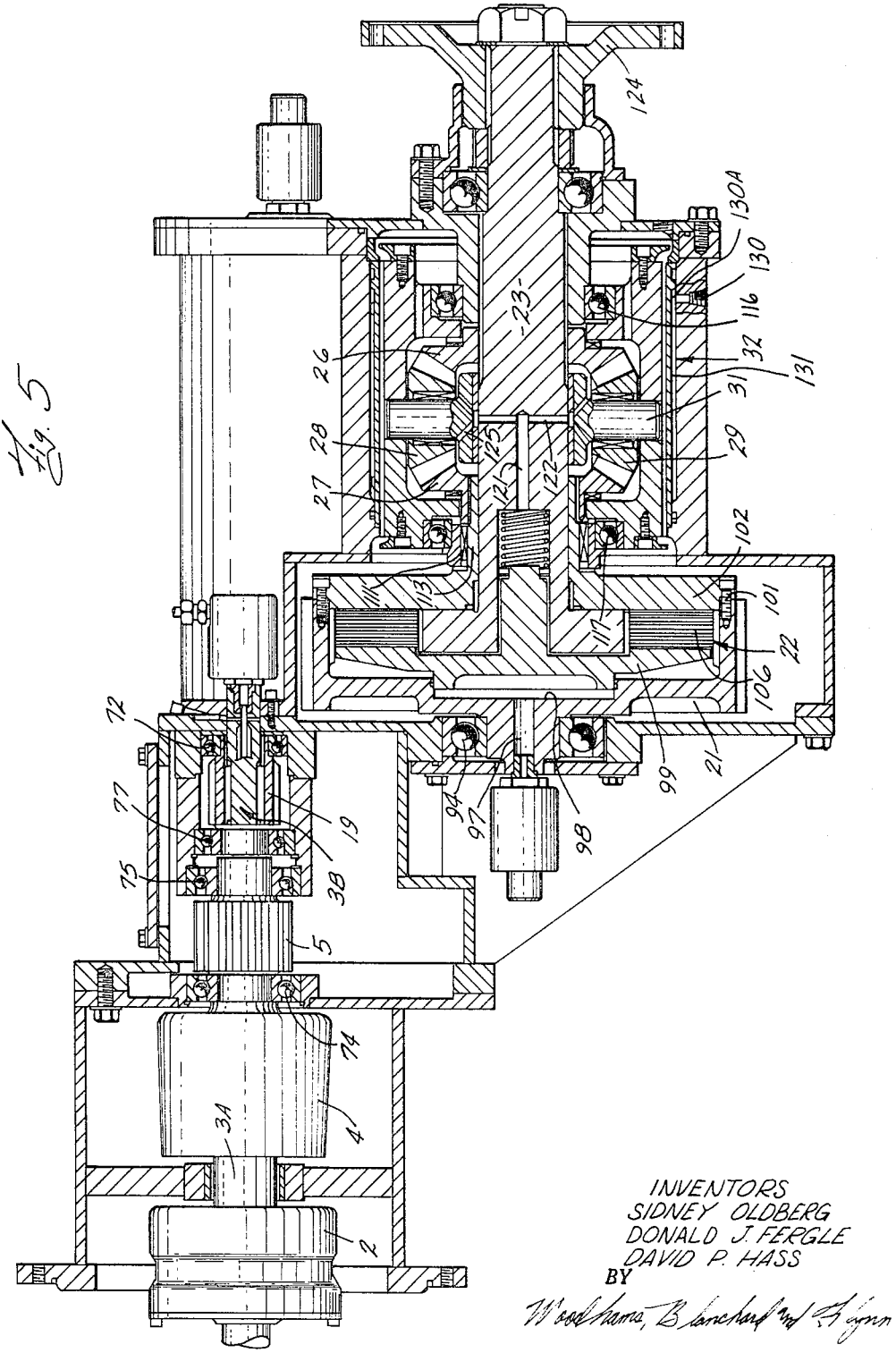

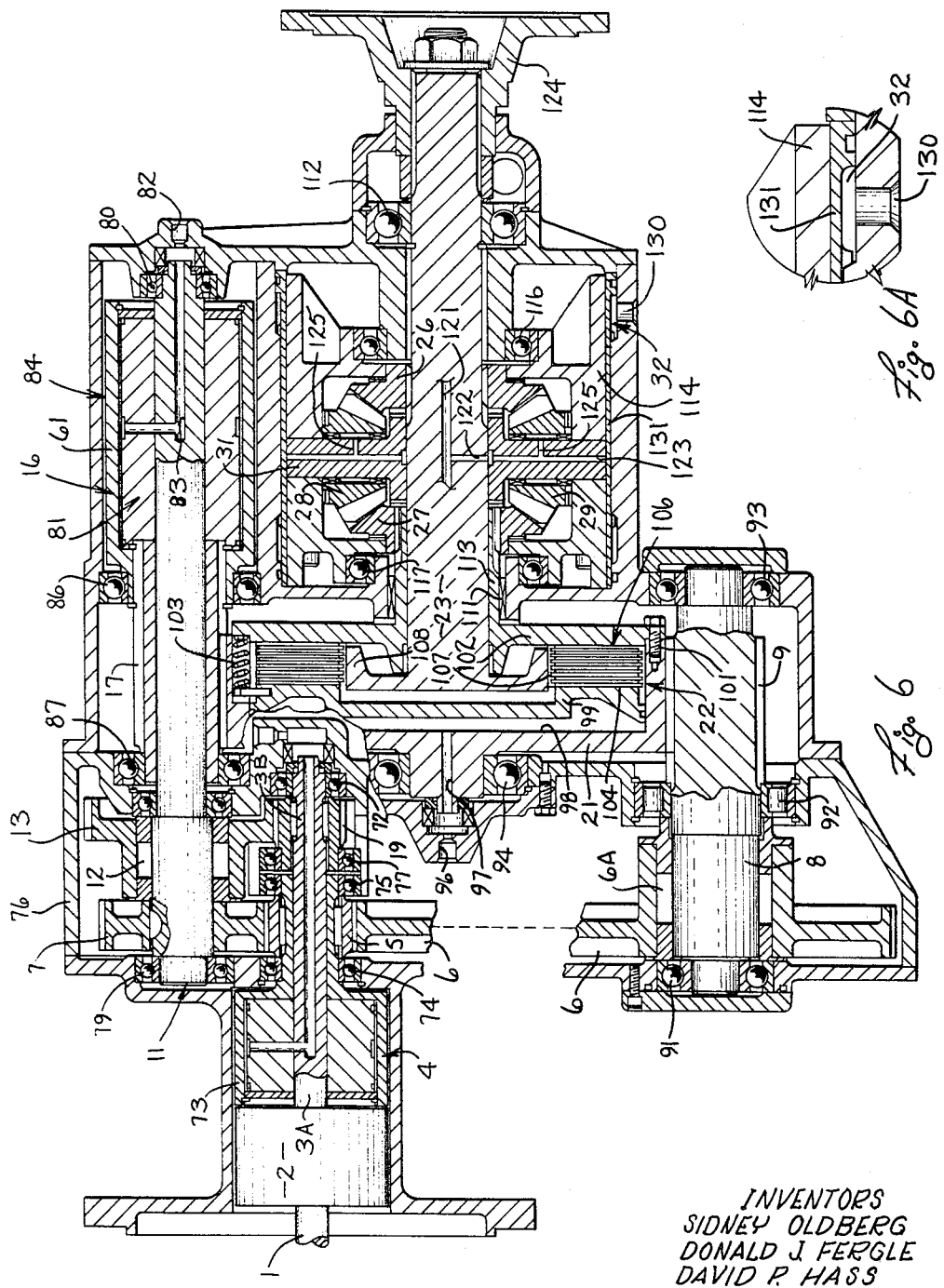

United States Patent Office 3,412,625
Patented Nov. 26, 1968

3,412,625
TRANSMISSION SYSTEM
Sidney Oldberg, Birmingham, Donald J. Fergle, St. Clair Shores, and David P. Hass, Detroit, Mich., assignors to Eaton Yale & Towne Inc., Cleveland, Ohio, a corporation of Ohio
Filed May 19, 1966, Ser. No. 551,446
17 Claims. (Cl. 74—368)

ABSTRACT OF THE DISCLOSURE

A drive train capable of providing a continuous flow of power during a shifting operation, such drive train being located between a driving device and a load to be driven thereby, said drive train having torque limiting means for transmitting torque of a value at and below a predetermined value for a preselected speed and not transmitting torque above said predetermined value and a transmission having a plurality of gears and selectable clutch means so that the torque limiting means will permit adjustment of the speed relationship between the driving device and the load following the shifting operation without transmitting torque in excess of said predetermined value while the clutch means prevents disconnection of said driving device from the load during shifting.

---

This invention relates to transmissions and particularly to a transmission adapted for use with a gas turbine type of prime mover, namely, a transmission utilizing positively interengaging gears as ratio elements but effecting shifting thereof without at any time releasing load from the prime mover.

In a number of uses for gas, including steam, turbines, it is essential that power output from the system be available at a wide range of speeds. This is particularly true with automotive use. However, since turbines are efficient, and in many cases even effective, only through a relatively narrow range of speeds, it is necessary to provide ratio shifting means between the power output and the load being driven thereby. This introduces a problem not present in providing ratio means for reciprocating engines, namely, that of constantly maintaining a load on the turbine output at all times. This necessity for a continuous load on the turbine output arises from the well-understood turbine characteristic, namely, that the constant pressure on the driven blades, together with the relatively low moment of inertia of the turbine rotor, results in an extremely great increase in rotative speed of the turbine if the load thereon is removed even for only a very short period of time. For example, in an automotive especially a truck-type turbine normally rotating at approximately 30,000 r.p.m. under full load, and if no governor is present a release of load thereon for only a very short period of time will permit such an increase in turbine speed as in many instances to cause destruction of the turbine.

Because of this, it has been assumed that a spur gear type of transmission, wherein the gears momentarily go into neutral during a shifting operation, is inapplicable to turbine use without the use of a governor and this adds further expense and inconvenience to the system. Accordingly, in spite of the recognized better efficiency of a geared transmission over one using a torque converter as the ratio modifying unit, most efforts, insofar as we are aware, to provide ratio-shifting means in conection with turbines have involved torque converter devices, motor generator units or other expensive and/or inefficient means.

Accordingly, the objects of the invention include:

(1) To provide a transmission system capable of utilizing positive gearing as the ratio effecting elements which is applicable for use with a gas, including steam, energized turbine.

(2) To provide a transmission system, as aforesaid, which will maintain load on the turbine constantly including during shifting of the geared ratio means.

(3) To provide a transmission system, as aforesaid, comprising a serially connected torque limiting device and a gear set wherein relatively simple controls, either automatic or manual, will be effective to modify the maximum torque transmittable through the torque limiting device appropriately, during or as a result of a shifting operation, to maintain said maximum torque at all times close to but greater than the torque developed by the engine.

(4) To provide a transmission system, as aforesaid, capable of operating with the efficiency of presently known gear-type transmission devices.

(5) To provide a transmission system, as aforesaid, of such construction that it is economical to manufacture and to maintain in good operating condition.

(6) To provide a transmission system, as aforesaid, which may within the scope of the invention be widely modified to meet a variety of specific operating requirements and conditions.

Other objects and purposes of the invention will be apparent to persons acquainted with apparatus of this general type on reading the following specification and inspecting the accompanying drawings.

While the transmission embodying the invention may include a wide variety of specific gearing arrangements, a wide variety of clutching means between the ratio gears and the shafts on which they are mounted as well as a variety of other components, one specific embodiment thereof will be utilized hereinafter to illustrate the invention. It will be recognized, however, that such embodiment is for illustrative purposes only and same will not be considered as limiting excepting as provided and defined by the hereinafter appended claims.

In the drawings:

FIGURE 1 is a schematic diagram of a transmission embodying the invention.

FIGURE 1A is a diagram similar to FIGURE 1 indicating the power flow path through the transmission in first gear.

FIGURE 1B is a diagram similar to FIGURE 1A which shows the power flow path in second gear.

FIGURE 2 is a torque-velocity curve illustrating one of the principles of the invention.

FIGURE 3 is an end view of a transmission embodying the invention.

FIGURE 4 is a section taken on the line IV—IV of FIGURE 3.

FIGURE 5 is a section taken on the line V—V of FIGURE 3.

FIGURE 6 is a composite sectional view of a transmission similar in general arrangement, though not identical in all details, to the transmission of FIGURES 4 and 5 but with the torque transmitting shafts thereof laid into a single plane for ease of examination.

FIGURE 6A is a fragmentary illustration of the portion of FIGURE 6 encircled by a broken line and enlarged for clarity.

FIGURE 7 is a central section of a fragment of FIGURE 6 and showing the details of a preferred clutching mechanism.

FIGURE 8 is a schematic view showing certain control mechanism which may be utilized with a transmission embodying the invention for minimizing the shocks between shifting steps thereof.

FIGURE 9 is a family of torque-velocity curves relating to the control mechanism of FIGURE 8.

FIGURE 10 is a torque-speed curve similar to FIGURE 2 but for another prime mover.

GENERAL DESCRIPTION

In general, the invention contemplates a transmission having shiftable gears, some thereof being connectible to their respectively supported shafts by suitable engageable and disengageable clutches and the others thereof being so connected by overrunning clutches that ratio shifts can be made. Either the input or the output of said transmission includes a torque limiter device capable of transmitting torque up to but not beyond a predetermined value. Said value is set at a point in excess of that required to drive the load to which the transmission is connected but less than that required to decelerate the turbine on an upshift or accelerate same on a downshift. Said value is modified if necessary in proportion to the speed of the vehicle at any given time so that said value remains in approximately the same proportional relationship with respect to the output torque of the engine at all speeds within the normal shifting range of the vehicle. Particularly, the transmission system of the invention may be used with any type of power means wherein the output torque characteristics thereof vary as a function of the speed thereof substantially similarly to the characteristics of said torque limiter when similarly taken as a function of speed, similarly plotted graph lines for the torque-speed functions of each being substantially parallel with each other but with the torque transmitting capacity of the torque limiter being under all conditions a small amount greater than the torque producing capacity of the engine under corresponding conditions.

DETAILED DESCRIPTION

It will be recognized that while the invention is especially applicable to heavy-duty truck use, it is also applicable to off-highway use or to mine, industrial, or other uses wherein substantially instantaneous shifts are required under heavy loads. It is further so applicable, especially in its broader aspects, regardless of whether the power source is a gas turbine or a diesel or gasoline engine. However, the particular embodiment of the invention here chosen for illustrative purposes was in fact designed for specific use with a gas turbine for driving an automotive truck and such use will be assumed hereinafter for the purpose of illustrating the invention.

Turning now to the drawings, referring first to FIGURE 1, there is indicated at 1 the power source which may be any convenient means, but in this instance, is assumed to be a gas turbine designed primarily for automotive use. A torque limiting clutch 2 drives an input shaft 3 which acts through a smoothly engageable, as friction, clutch 4 to drive the input gear 5. Said input gear 5 is in constant mesh with gears 6 and 7. The gear 6 acts through an overrunning clutch 6A to drive the shaft 8 and from it the gear 9. The gear 7 acts through part 11A of the shaft 11 to drive, through an overrunning clutch 12, the gear 13 and then through the part 11B of the shaft 11 and a friction clutch 16, the gear 17. Gears 13 and 19 are in constant mesh, gear 19 being mounted for rotation on and with the portion 3B of shaft 3. Both gears 9 and 17 are in constant mesh with a gear 21 which acts through a smoothly engageable, as friction, clutch 22 to drive a shaft 23 which drives one side of suitable direction reversing means 24, in this instance, the bevel gear 26. The gear 21 also drives the other side of the gear reversing means 24, in this instance, the bevel gear 27. The bevel gears 26 and 27 drive opposite sides of the bevel gears 28 and 29 which are mounted in a suitable frame 31 and are permitted to rotate or to be fixed as desired through a clutch 32 with respect to a suitable portion of the frame 33. The bevel gear 26 drives the output shaft 34. It should be noted that FIGURES 1, 1A and 1B, as schematic diagrams, are intended to illustrate the general arrangement of basic parts of the transmission and the power flow therethrough in several shifted positions and are not intended to illustrate relative gear sizes or ratios which might be employed in an actual transmission.

OPERATION

The operation of the apparatus may be sufficiently indicated with reference to the above-described schematic illustration and a consideration of same at this point will aid in the further and more detailed understanding of the specific embodiment of the invention described further hereinafter.

In the first gear position (FIGURE 1A), the friction clutches 4 and 16 are both open while the forward drive clutch 22 is closed and the reverse drive clutch 32 is open. Thus, no power is transmitted through the clutch 4 and the shaft 3 drives directly the gear 19. This in turn drives the gear 13 and through the overrunning clutch 12 drives the portion 11A of the shaft 11. This drives the gear 7 which drives through the gear 5, same in effect now being an idler, to drive the gear 6. This acts through the overrunning clutch 6A to drive the shaft 8 and the gear 9, thence through the gear 21, the clutch 22 and the shaft 23 to drive the gear 26. Gear 21 also drives gear 27 directly, thus driving both of gear 27 and 26 at equal speeds and in the same direction. Since the reverse clutch 32 is open, the cage 31 rotates freely and the gear 26 drives the output shaft 34. The arrows in FIGURE 1A trace the path of power flow in this position.

In shifting to second gear, the friction clutch 4 is connected and the friction clutch 16 remains disconnected. This, as shown by the arrows in FIGURE 1B, switches the power flow from the shaft 3 through the friction clutch 4 to the gear 5 and thence from the gear 6 to the output shaft 34 as previously described. With the clutch 16 remaining open, the driving of the gear 17 by the gear 21 becomes of no consequence and may be ignored. Since the gear 5 is larger than the gear 19, the shaft 11 is driven faster from the gear 5 than it would be through the gear 19 and the overrunning clutch 12 in effect disconnects the gear 13 from the shaft 11 so that the gear 13 runs freely with respect to the shaft 11. Thus, the power flow is as above described. By this arrangement, the transmission is in a gear ratio which, the shift being an upshift, required the input shaft to travel at a slower speed than previously. The turbine thus exerts an inertia torque over and above its rated or steady speed torque which must be overcome in reducing the speed of the turbine in connection with such shifting. The additional torque required to slow down the turbine is in excess of the capacity of the torque limiter but less than the capacity of the torque friction clutches. The torque limiter, therefore, slips until the turbine speed satisfies the requirements of the gear ratio. Since the inertia, the speed change and the torque characteristics are all known for a given device, the time during which such slipping will be required can be calculated for a given transmission. During this slipping period, however, torque is still transmittable to the rear axle through the torque limiter at a value somewhat greater than the engine's steady speed driving torque as indicated in FIGURE 2. Thus, there is no power interruption to the wheels after the actuation of the expanding clutch 4 even though the torque limiter 2 is slipping.

Additionally, where the power flow from the vehicle wheels remains substantially constant due to inertia thereof, the shock which would otherwise be imposed on the engine by what amounts to an instantaneous shifting of the transmission, and resulting high rate of deceleration of the engine, is also softened by the slipping of the torque limiter. In other words, the deceleration of the engine in an upshift normally obtained during a period of power interruption, and the avoidance of shock accomplished thereby, is now accomplished following a substantially instantaneous shift by slipping of the torque limiter. Further consideration of the basic principles around which this invention was organized will be undertaken later herein in connection with a discussion on the necessity for and the nature of the controls provided for the apparatus hereinabove described.

The third gear forward is brought about by first engaging the clutch 16 and then, as soon as the engine is at least substantially synchronized to the new speed, releasing the clutch 4. More particularly, the engagement of the clutch 16, bearing in mind that the gear 7 and the shafts 11A and 11B were all previously being driven by the gear 5, effects driving of the gear 21 therethrough. Said gear 21 continues to drive through the clutch 22 and shaft 23 to the output shaft 34 as above set forth. The clutch 4 is now opened which releases the gear 5 and the drive now goes through the gears 19 and 13 to the shaft 11B and thence through the gears 17 and 21 to the shaft 23 and to the output as previously described. Since the gear 5 is larger than the gear 19, the output speed is greater in proportion to the input speed than in the second gear arrangement and the gears of the transmission are now in their third gear position. Again, the engine is transmitting power continuously through the torque limiter 2 and there is at no time any break in the transmission of power from the engine to the output load.

Since the gear 17 is now driving the gear 21 at a higher rate of speed than was the case when same was driven from the gear 9, the connection thereto of the gear 9 and shaft 8 will effect a higher rotational speed of the shaft connected portion of the clutch 6A than occurs from its driving through gears 6 and 5, whereby the release mechanism of the overrunning clutch 6A is brought into operation and the shift above described is permitted to occur.

Thus during a shift from second to third, as the clutch 16 is engaged and prior to the disengagement of clutch 5, the transmission passes briefly through fourth gear, a selected shift to fourth being discussed hereinafter. As a result, it will be seen that the transmission is readily shiftable from second to fourth gear directly, if desired.

Fourth gear forward is brought about by re-engaging the clutch 4 and causing the gear 5 driven thereby to again drive the gear 7 thence through the shaft 11 and friction clutch 16 to drive the gear 17 at a slightly faster rate than it was driven when the driving thereof was through the gear 19. This moves the transmission into fourth speed forward. The increase in the speed of the shafts 11A and 11B is permitted by the overrunning clutch 12 and the still further increase in the speed of the shaft 8 is permitted by the overrunning characteristics of the clutch 6A.

Because of the several overrunning clutches, it is not possible to provide for a reverse driving in the conventional manner. Therefore, the reverse clutch 32 is provided which, when it is engaged, prevents rotation of the cage 31. Thus, with the clutch 22 open, the gear 27 acts through the gears 28 and 29 to drive the gear 26 in a reverse direction, thereby reversing the rotation of the output shaft 34. It will be apparent that all of the gear ratio shifts above described may be carried out for the reverse direction in the same manner and under the same conditions as above described for the driving of the output shaft 34 in a forward direction.

Although it is contemplated that the torque limiter 2 may be located at the output end of the transmission, the input location is preferred since only the turbine exerts an inertia torque on the input location torque limiter. On the other hand, a torque limiter located at the transmission output end would be subject to the inertia torque of the rotating transmission parts in addition to the turbine inertia torque as well as to the effect of the gear ratios. It will be recognized in this connection that instead of maintaining the clutches 22 and 32 in a completely on-off opposite relationship with respect to each other, the effect of the torque limiter 2 may be obtained by permitting controlled slippage of opposite amounts in said clutches 22 and 32. Thus, by effecting a slight amount of slippage in the clutch 22 and a large amount of slippage in the clutch 32 the shaft 34 will still be driven in a forward direction but a maximum torque transmittal through the entire system will be established. The converse effect may be obtained for reverse drive by permitting a small amount of slippage in clutch 32 and a corresponding large amount of slippage in the clutch 22. However, it being relatively difficult to control accurately such amounts of slippage, particularly to control same with respect to each other, this system at present is not preferred.

It should be observed that all four ratios, in either forward or rearward direction, are secured by only two controlled clutches, namely the clutches 4 and 16. Said clutches may be of any gradually engageable form, such as the friction clutch above referred to or they may be a smoothly energizable magnetic clutch. One effective form of frictional clutch here shown as the clutch 16 in FIGURE 7 includes a sleeve 61 supported by and drivingly connected with suitable gear structure, here the gear 17. An internal annular base 62, preferably made of heat absorptive material, is drivingly connected in any suitable manner, such as by spline 63, to a shaft, here the shaft 11B (FIGURE 1), which is internally supplied with pressure oil communicating through the conduit 64 (FIGURE 7) to the periphery of the base 62. Cap-shaped end rings 66 and 67 are fixed to the base 62 and clamp tightly in place the expansible member 68, the same being here illustrated as of elastomeric nature but which has successfully been made of other materials including steel. A cylindrical heat sink member 69 telescopes with the expandable member 68, is supported closely thereby and extends between the flanges of the cap rings 66 and 67. Said member 69 is of a material having a high heat conductivity, in order to minimize the concentration of heat at the surface thereof which lies near the expansible member 68, and is solidly affixed, as by suitable adhesive or mechanically, to the casing 61. Thus, when pressure fluid is introduced through the port 64 into the zone radially within the expandable member 68, the same will be expanded and the member 68 will engage the heat sink member 69 for frictionally bringing the sleeve 61, and thereby the gear 17, into rotative synchronism with the clutch base 62.

Turning now to FIGURES 3 to 6, inclusive, and recognizing that the above description of the transmission as a whole has been of a schematic representation, the description will now set forth one actual embodiment of the invention, it being understood that FIGURES 3 to 5 represent the actual unit in question while FIGURE 6 is a partially illustrative and partially schematic view setting forth the positional and operational relationships of the mechanism shown in FIGURES 3 through 5. Thus, while the description will itself make direct reference to FIGURE 6, it will be understood that the description also refers to FIGURES 3 through 5.

Referring now to said figures, the shaft 1 drives one set of plates 2A (FIGURE 4) of the torque limiter 2 which are suitably interleaved with a second set of plates 2B thereof, the same being spring loaded by spring 2C to transmit a predetermined amount of torque from one set of plates to the other set of plates and arranged to slip when said predetermined amount of torque is exceeded. Said second set of plates 2B is connected to the part 3A of the shaft 3 which supports in nonrotative relationship thereto the internal portions of the clutch mechanism 4. The shaft 3 is supported at its rightward end within the housing or frame structure 76 of the transmission by a bearing 72. The external portion 73 of said clutch 4 surrounds and is rotatably supported on said shaft 3A and, further, is supported by bearings 74 and 75, said bearings being in turn supported in the housing structure 76 in any convenient manner. The gear 5 is here keyed to the rightward end of the external portion 73 between said bearings 74 and 75. The gear 19 is formed on the rightward part 3B of the shaft 3 and is, if desired, further supported by a bearing 77 which is likewise suitably supported on the housing 76 in any convenient manner.

The shaft 11 is supported in said housing 76 by any convenient bearings such as the bearings 79 and 80. The gear 7 is keyed solidly to said shaft 11 while the gear 13 is connected thereto through the conventional overrunning clutch schematically illustrated at 12. It will be noted that the gear 13 is slightly larger than the gear 7. The shaft 11 also supports the internal portion 81, including the base 62 above described, of the expanding clutch 16 in nonrotative relationship therewithin. Manually controllable pressure oil is admitted from any convenient source, not shown, through a port 82 into the passageway 83 of the shaft 11 for actuation of the clutch 16 as above described. The external portion 84 of said clutch, including the sleeve 61, is solidly connected to the gear 17 and is supported by suitable bearings, such as the bearings 86 and 87.

The gear 6 is supported through the overrunning clutch schematically indicated at 6A on the shaft 8, which latter is supported in any suitable manner in the housing 76 by a bearing, such as the bearings 91, 92 and 93. The gear 9 is, if desired, formed directly on the shaft 8 for constant rotation therewith.

The gear 21 is in mesh with the gears 9 and 17 as above described and is supported in this embodiment by bearing structure 94 on and rotatably with respect to the housing 76. A port 96 admits fluid under pressure which is transmitted through a passageway 97 in the gear 21 into a chamber 98 for operating the piston 99 of the clutch 22. The gear 21 is drivingly connected in any convenient manner, as by the screws 101, to a flange 102 whose hub is rotatably supported on or with respect to the shaft 23. Suitable springs 103 are applied in a conventional manner for urging the piston 99 and the flange 102 apart when the fluid pressure is released. One set 104 of clutch plates 106 are arranged to rotate with the gear 21 and the other set 107 of said plates are arranged to rotate with the flange 108 which is rotatable with, and in this case integrally connected to, the shaft 23. Said shaft 23 is supported in suitable bearings, such as the bearings 111 and 112 carried by the housing 76 of the transmission.

The gear 27 is splined to the hub 113 of the flange 102. The gear 26 is splined to the shaft 23. The gears 28 and 29 are meshed therewith and are rotatably supported on a spider 114 which is in turn rotatably supported by bearings 116 and 117 on or with respect to the frame 76 of the apparatus. The clutch 32, which in this instance is a contracting clutch of any suitable kind, is provided for arresting rotation of the spider 114. Said clutch 32 is actuated by oil under pressure which is supplied in any suitable manner through the port 130 (FIGURE 5) to the chamber 130A.

If desired, oil may be also supplied through passageways 121 and 122 to passageway 125 to lubricate the gears 28 and 29 and thence the gears 27 and 26.

If desired, a suitable drive flange 124 may be splined to the output end of the shaft 23.

The operation of the apparatus herein described in detail will be apparent from the description set forth above with respect to the schematic illustration in FIGURES 1A and 1B so the further elaboration thereof will not be necessary.

While the transmission has four forward speeds in this particular embodiment of the invention, it will be apparent that the principles thereof may be applied to the transmissions having other gearing ratios and other numbers of gear ratios. Further, the forward drive portions of the invention may be applied to transmissions having different types of reverse mechanisms and having various other characteristics within the broader aspects of the invention.

In the present embodiment of the invention there have been utilized certain overrunning clutches whereby all ratio shifting operations can be brought about by the use of only two manually controllable clutches. However, it will be recognized that the real function of such overrunning clutches is to provide for disconnecting of the device therethrough immediately upon the occurrence of a torque reversal consequent upon the engagement of one or both of the selectable clutches and also to effect immediate re-engagement of same upon other arranging of said selectable clutches. Accordingly, it will be understood that one or more of said overrunning clutches may be replaced by further manually controllable engageable and disengageable clutches providing only that the timing of same is sufficiently accurate that engagement or disengagement of same is accurately related to the engagement or disengagement of the clutches which in the present embodiment are the selectable clutches. In other words, for example, the clutch 6A, which is in the present embodiment shown as an overrunning clutch, may be another manually controllable clutch providing only it is caused to engage and disengage in sufficiently accurate relationship to the engagement and disengagement of the clutches 4 and 16 that there is neither any break in the power transmission from the input shaft of the transmission to the output shaft thereof nor appreciable engagement of said clutch 6A simultaneously with, that is, overlapping, either of both the clutches 4 or 16. However, it will also be recognized that since clutches 4 and 16 permit some slippage, a limited amount of such overlapping may be tolerated.

More particularly, it will be recognized that where the engine has a speed-torque relationship shown by line 182 in FIGURE 2, which represents the speed-torque relationship of a gas turbine or of a diesel acting through a torque converter, it will be necessary to maintain the speed-torque transmission characteristics of the torque limiter shown by line 181 higher but of generally similar shape. Thus, line 181 in FIGURE 2 will remain a short distance above but substantially parallel to the line 182. Further, as the load requirements on the engine vary so that its torque output moves down, such as to the position of the line 183 in FIGURE 2, then the operation of the torque limiter must be modified so that its speed-torque line moves down to the position of the line 184 whereby it continues to remain only a short distance above, but still generally parallel to, the line 183.

Likewise where the engine is either a gasoline engine or a diesel engine, and used without a torque converter, the speed-torque relationships thereof will be as illustrated by line 186 of FIGURE 10. In such case, the speed-torque relationships of the torque limiter must, for reasons already recognized, be arranged so that in the speed range within which said engine will be shifted, the torque limiter will, similar to the cases above set forth, have a speed-torque relationship as illustrated by the line 187 in FIGURE 10, substantially parallel to and spaced slightly above the line 186.

Therefore, the torque limiter must be controlled both with respect to the speed of the engine and with respect to the load imposed thereon to meet the conditions above set forth under all speed and torque conditions of the power source.

MODIFICATION

If desired, means may be provided for adjusting the maximum torque transmittable by the transmission in order to minimize the likelihood of jerky transmission output as when the mechanism is operated under relatively light loads at high turbine torque output settings. For example, the transmission output shaft normally is loaded so as to maintain a substantially constant speed when the transmission is upshifted, so that the turbine engine must slow down. The inertia torque is generated by the decelerating turbine engine, is a function of the deceleration rate and adds as above discussed to the torque which the turbine engine can exert at a given steady speed. Unless limited by slippage in the torque limiter, the total engine deceleration torque will introduce undesirable shocks to the turbine, transmission and load.

However, the torque limiter by itself and, hence, the transmission has a fixed speed-torque relation whereas the steady speed torque and hence the total deceleration torque of the engine may vary widely with instantaneous engine speed and with engine fuel intake as shown in FIGURE 9. Thus, to maintain the slippage point above but close to the steady speed engine torque, such slippage point must be varied in conformance with the instantaneous engine operating conditions.

While various mechanisms may be provided to carry this out, this aspect of the invention will be sufficiently illustrated by the compensating device 131 indicated schematically in FIGURE 8, the compensating device 131 detects the instantaneous steady speed-torque output of the turbine engine, a conventional turbine engine being indicated at 132 for purposes of illustration, and changes the torque required to cause slippage in the engine-load connection. It is contemplated that the forward and/or rearward clutches 22 and 32 can be made to slip in a controlled manner when engaged by selectively reducing the fluid pressure applied to the passages 97 and 121, respectively. However, it is preferred that the torque carrying ability of the transmission be adjusted through adjustment of the torque limiter 2 as hereinafter described.

The turbine engine 132 illustrated includes a gas generating portion 133 comprising an air compressor wheel 134 driven through a shaft 136 by a generator turbine wheel 137. The rotating compressor wheel 134 forces air into combustion chambers 138 into which fuel is injected and ignited, the rapidly expanding exhaust gas turning the generator turbine 137. A free turbine wheel or drive turbine wheel 139 is also rotated by the expanding gas. The drive turbine 139 is mounted on an output shaft 141 for driving the input shaft 1 of the transmission by any convenient means, not shown.

In the particular embodiment shown, the device 131 is arranged to detect the rotational speed of the free turbine 139 and the operating speed of the gas generator 133 from which as indicated in FIGURE 9, the steady state torque of the turbine engine 132 can be found. The free turbine speed can be detected in a number of ways as, for example, from the output of an electric tachometer, centrifugal air compressor or the like driven by the free turbine 139. However, in the present embodiment, the free turbine speed is determined by sampling pressure of a conventional oil pump 142 driven by the output shaft 141.

In the particular embodiment shown, the device 131 comprises a generally L-shaped casing 146. The casing 146 is rigidly supported adjacent its rightward end on the piston rod 147 of a pressure fluid piston 148 so that the position of the casing 146 varies with the position of the piston 148. The piston 148 is axially slideable along a cylinder 149 preferably located in the transmission housing 76. The upper end of the cylinder 149 connects as indicated by the broken line 151 with the pressurized gas output of the compressor 134, the resulting downward pressure on the piston 148 thus being proportional to the rotational speed of the gas generator shaft 136 at a constant temperature. A spring 152 urges the piston 148 upwardly. The spring 152 is responsive to the temperature of the gas in the portion of the cylinder 149 below the piston 148 which is connected to the inlet to the compressor 134 as indicated by broken lines 151A. The spring 152 operates as a function of the inlet air temperature to compressor 134 in a manner to increase its upward force on the piston in response to an increase in the temperature of the inlet air. A rise in air temperature reduces mass flow of air into the engine resulting in lower torque and horse power for a given air inlet pressure. Thus a shift of the piston in the cylinder is proportional to a change in mass air flow through the gas generator whether due to a change in inlet air temperature or to a change in generator shaft speed.

The leftward portion of the casing 146 defines a cylinder 154 which parallels the cylinder 149. A piston 156 is vertically slideable in the cylinder 154. A flexible inlet conduit 157 connects the upper end of the cylinder 156 with the output of the free turbine pump 142 as indicated by the broken line 157A so that the pressure supplied to the upper end of the piston 156 is proportional to the speed of the free turbine 139 and hence of the shaft 150. The lever 158 is pivotally mounted intermediate its ends at 159 on and within the casing 146. The leftward end of the lever 158 is pivotally affixed as indicated at 161 to the piston rod 162 which depends rigidly from the piston 156. A variable rate coil spring 166 urges the piston rod 162 upwardly and is arranged so that the pressure required to move the piston 156 downwardly varies with the distance it is moved in a relationship substantially similar to the turbine speed-torque curve of the engine. The rightward end 163 of the lever 158 controls, here through linkage 164, the opening of a flow restrictor valve 168 fed by an oil pump 167. The output of said valve is fed through conventional passages schematically represented by the dotted line 172 to the shaft 3 and thence to the annular chamber 171 in the torque limiter 2. Pressure fluid in the chamber 171 urges the annular piston 173 rightwardly against the spring 2C and, thus, an increase in fluid pressure from the pump 167 decreases the torque capacity of the torque limiter 2. The linkage 164 is arranged so that downward movement of the pivot 163 decreases the output from the valve 168 and thereby increases the torque capacity of the torque limiter 2.

To briefly summarize the operation of the device 131, an increase in gas generator shaft speed results in an increased pressure which urges the piston 148 downwardly and therewith the casing 146 and rightward end 163. This increases the torque capacity of the torque limiter 2 to correspond to the increase shown in FIGURE 9 of free turbine torque with an increase in gas generator speed.

On the other hand, with increase in free turbine speed, the output pressure of the pump 142 increases thereby moving the piston 156 downwardly. The end 163 is thus urged upwardly to decrease the torque capacity of the torque limiter 2, the variable rate spring 166 gradually lessening the torque capacity drop as turbine speed increases. In this manner, the torque carrying capability of the torque limiter 2 is made to follow the torque of the free turbine which, as shown in FIGURE 9, decreases at a diminishing rate with an increase in turbine speed. As a result, there will be sufficient slippage of the torque limiter to allow the free turbine to drop to its new operating speed upon an upshift in a relatively gradual manner while transmitting torque somewhat in excess of the steady speed torque of the turbine.

In this way, the control device 131 maintains the torque transmitting capability of the torque limiter 2 under all conditions of operation of the engine at a value sufficiently above that of the engine to enable same to function as above described but which under all conditions of operation of the engine will follow the changes in the torque output of the engine so as to maintain a slight differential between the output of the engine at any given time and the maximum torque transmitting capacity of the torque limiter 2 at the same time.

It will be apparent that with other types of engines, other specific control mechanisms will be required but same can be readily designed in the light of the foregoing to be applicable to any particular engine with which the invention is to be adapted.

Although a particular preferred embodiment of the invention has been disclosed above for illustrative purposes, it will be understood that variations or modifications which lie within the scope of the appended claims are fully contemplated.

The embodiments of the invention in which an exclusive property or privilege is claimed are defined as follows:

1. In a drive train capable of providing a continuous flow of power during a shifting operation, said drive train being located between a driving device and a load to be driven thereby, the combination comprising:

torque limiting means for transmitting torque of a value at and below a predetermined value for a selected speed and not transmitting torque above said predetermined value;

a transmission having a plurality of gears and selectable clutch means for coupling selected ones of said gears to form a gear train in series with said torque limiting means drivingly connecting said driving device and said load and for maintaining a torque transmitting connection therethrough during shifting thereof;

whereby said torque limiting means permits adjustment of the speed relationship between said driving device and said load following the shifting operation without transmitting torque in excess of said predetermined value while said clutch means prevents disconnection of said driving device from said load during shifting.

2. The device defined in claim 1 wherein said gears are continuously meshed and said clutches are synchronized to prevent an open power flow path through said transmission while minimizing overlapping of successive power flow paths therethrough.

3. The device defined in claim 1 wherein said clutch means has the characteristic of gradual torque pickup from minimum torque transmission therethrough to maximum torque transmission therethrough.

4. The device defined in claim 1 wherein said torque-limiting device is arranged so that said value is in excess of the normal torque to be transmitted thereby to the load and less than the torque transmitting capacity of said clutch means.

5. The device defined in claim 1 wherein the torque-limiting means is positioned at the input end of said transmission.

6. The device defined in claim 1 including overrunning clutches so located within said transmission that engagement of said selectable clutch means results in effective disengagement of those of the gears associated with said overrunning clutches whose torque is reversed by action of a selectable clutch.

7. The device defined in claim 1 wherein the torque-limiting means is positioned at the input end of said transmission and wherein further there are overrunning clutches so located within said transmission that engagement of said selectable clutch means results in effective disengagement of those of the gears associated with said overrunning clutches whose torque is reversed by action of a selectable clutch.

8. In a transmission system utilizing interengageable gears and providing for constant transmission of torque during at least one shifting operation, the combination comprising:

an input shaft;

a torque-limiting device driven by said input shaft and having the characteristic that it will transmit torque up to and including a predetermined amount thereof and will not transmit torque in excess of said amount;

a first shaft driven by the output of said torque limiting device and having the driving side of a selectable clutch mounted thereon, said clutch having a characteristic of gradually transmitting torque therethrough under the control of an operator from zero to the maximum value transmittable thereby, such as a friction clutch;

a first gear driven by said selectable clutch and a second gear mounted for constant driving by said first shaft;

a third gear in constant mesh with said first gear and a fourth gear coaxial with said third gear and in constant mesh with said second gear, said second gear having fewer teeth thereon than said first gear;

a second shaft arranged for constant rotation with said third gear and an overrunning clutch between said second shaft and said fourth gear, the direction of the overrunning characteristic thereof being such that said fourth gear can drive said second shaft but said second shaft will not drive said fourth gear;

load means connecting said second shaft to a load;

whereby (a) when said selectable clutch is disengaged the power flow from said input shaft through said torque limiter to said first shaft goes through said second gear to said fourth gear and thence through said overrunning clutch to said second shaft and thence to said load and (b) when said selectable clutch is engaged, the power flow from said input shaft through torque-limiting device to said first shaft goes through said first gear to said third gear and thence to and through said second shaft to said load, said fourth gear being effectively disconnected by the operation of said overrunning clutch, and whereby also the torque required for changing the engine speed to accommodate an upshift effects a slipping within the torque-limiting device without interrupting the transmission of torque therethrough.

9. The device defined in claim 8 including also a second selectable clutch and a fifth gear, said fifth gear being driveable by and from said second shaft through said second selectable clutch, a sixth gear in constant mesh with said first gear, a third shaft and an overrunning clutch between said sixth gear and said third shaft, the direction of said overrunning being such that said sixth gear will drive said third shaft but said third shaft will not drive said sixth gear;

output means constantly driven by said fifth gear and from said third shaft, the number of teeth in said sixth gear being greater than the number of teeth in said fourth gear to provide a third speed ratio, and the gearing relationship between said fifth gear and said third shaft being such that said third shaft will be driven faster when said output means is driven from said fifth gear and said sixth gear is driven by said first gear than when said output means is driven from said sixth gear and said third shaft;

whereby engagement of said first clutch and disengagement of said second selectable clutch will effect a drive through said sixth gear and said third shaft to said output, disengagement of said first clutch and engagement of said second selectable clutch will effect driving through said second and fourth gears and said second shaft through said fifth gear to said load and engagement of both said selectable clutches will effect driving through said first and third gears, said second shaft and fifth gear to said load, the driving of said load through said fifth gear being permitted by the overrunning clutch between said sixth gear and said third shaft.

10. The device defined in claim 9 wherein said output means further includes a seventh gear constantly rotatable with said third shaft; and wherein said output means further includes an eighth gear driven by both said fifth and seventh gears, said seventh gear having more teeth thereon than said fifth gear.

11. The device defined in claim 8 including also:

a second selectable clutch and a fifth gear, said fifth gear being driveable by and from said second shaft through said second selectable clutch;

a sixth gear in constant mesh with said first gear;
a third shaft and an overrunning clutch between said sixth gear and said third shaft, the direction of said overrunning being such that said sixth gear will drive said third shaft but said third shaft will not drive said sixth gear;
output means constantly driven by said fifth gear and from said third shaft whereby engagement of said first selectable clutch and disengagement of said second selectable clutch will effect a drive through said sixth gear and said third shaft to said output, disengagement of said first clutch and engagement of said second selectable clutch will effect driving through said second and fourth gears and said second shaft through said fifth gear to said load and engagement of both said selectable clutches will effect driving through said first and third gears, said second shaft and fifth gear to said load, the driving of said load through said fifth gear being permitted by the overrunning clutch between said sixth gear and said third shaft;
a seventh gear constantly rotatable with said third shaft;
an eighth gear driven by both said fifth and seventh gears, said seventh gear having less teeth thereon than said fifth gear; and
direction reverse means positioned between the eighth gear and said output shaft.

12. The device defined in claim 1 including means for varying the torque transmitting capability of at least one of (a) said torque limiting means and (b) said selectable clutch means as a function of variations in the torque output of the driving device in order to limit within a low maximum value regardless of the speed and load conditions of the engine, the inertia shock imposed on the driving device as a result of shifting of the transmission.

13. The device defined in claim 1 in which the driving device is the free turbine of a gas turbine engine having a gas generator portion; and including
means actuable for varying the said predetermined value of torque transmittable by said torque limiting means;
first means controlling said actuating means and responsive to the output of the gas generator for increasing the torque capacity of said torque limiter in correspondence to the increase in free turbine torque resulting from an increase in gas generator speed;
second means controlling said actuating means in cooperation with said first means and responsive to the speed of the free turbine for reducing the torque capacity of said torque limiter in correspondence to decreasing free turbine torque resulting when the speed thereof is increased.

14. The device defined in claim 1 including means for varying the torque transmitting capability of said torque limiting means in response to speed of driving device and in response to load imposed thereon so as to maintain under all speed and load conditions of the engine a continuously maintained differential between the torque developed by the engine and the torque transmitting capability of the torque limiter.

15. In a control device for controlling the magnitude of torque transmittable by a slip clutch in proportion to the engine speed and the torque load imposed on said engine, the combination comprising:
means sensitive to the speed of an element having a rate of rotation bearing affixed relationship to the rate of rotation of said engine and producing a first signal;
means sensitive to the torque load imposed onto said engine and producing a second signal;
means integrating said first and second signals to produce a third signal;
means applying said third signal to said clutch for controlling said magnitude of torque transmittable thereby.

16. The device defined in claim 15 wherein said first signal is the amount of displacement of a first resilient device and the second signal is the amount of displacement of a second resilient device, wherein said integrating means is a lever pivotally supported at one point in a predetermined relationship to said second resilient device and connected at a second point thereon with said first signal device, a third point on said lever constituting the output thereof and means operatively connected with said third point constituting an output and means responsive to the movement thereof for controlling the torque transmitting capability of said clutch.

17. The device defined in claim 15 including a generally F-shaped hollow casing comprising first and second cylinders spaced from each other and both mounted perpendicularly on and with respect to a hollow base; and
a reciprocable piston in each of said cylinders and a lever in said hollow base, an intermediate point on said lever connected to said first piston and one end of said lever connected to said second piston, movement of each of said pistons in one direction of each being resisted by resilient means;
pressure means responsive to the gas pressure developed within said engine for applying a pressure bearing a fixed relationship to said gas pressure operatively into said first cylinder and means responsive to the rotational speed of said engine for applying a pressure bearing a fixed relationship to said speed into said second cylinder;
a pressure generator having a variable output and means connecting the other end of said lever to means controlling said variable output;
conduit means conducting said output to pressure responsive control means on said clutch.

References Cited
UNITED STATES PATENTS

| | | | |
|---|---|---|---|
| 3,174,349 | 3/1965 | Renker et al. | 74—368 |
| 3,202,018 | 8/1965 | Hilpert | 192—3.22 |
| 3,042,165 | 7/1962 | Yokel | 192—3.5 |

FRED C. MATTERN, Jr., *Primary Examiner.*

H. S. LAYTON, *Assistant Examiner.*